United States Patent [19]

Gallagher, III et al.

[11] Patent Number: 6,072,383
[45] Date of Patent: Jun. 6, 2000

[54] RFID TAG HAVING PARALLEL RESONANT CIRCUIT FOR MAGNETICALLY DECOUPLING TAG FROM ITS ENVIRONMENT

[75] Inventors: William F. Gallagher, III, Phoenixville, Pa.; Shinichiro Inui, Haddonfield, N.J.

[73] Assignee: Checkpoint Systems, Inc., Thorofare, N.J.

[21] Appl. No.: 09/185,775

[22] Filed: Nov. 4, 1998

[51] Int. Cl.[7] .................................................. H04Q 1/00
[52] U.S. Cl. ............................................. 340/10.2; 342/51
[58] Field of Search ................................. 340/10.2, 10.1, 340/505, 572.5, 825.3, 825.34; 342/51; 29/829, 832

[56] References Cited

U.S. PATENT DOCUMENTS

| | | | |
|---|---|---|---|
| 3,752,960 | 8/1973 | Walton | 340/825.3 |
| 3,816,708 | 6/1974 | Walton | 340/825.3 |
| 4,481,428 | 11/1984 | Charlot, Jr. | 327/118 |
| 4,580,041 | 4/1986 | Walton | 235/380 |
| 4,583,099 | 4/1986 | Reilly et al. | 343/895 |
| 4,598,276 | 7/1986 | Tait | 340/572.5 |
| 4,600,829 | 7/1986 | Walton | 235/439 |
| 4,951,057 | 8/1990 | Nagel | 342/51 |
| 5,065,138 | 11/1991 | Lian et al. | 340/572.2 |
| 5,072,222 | 12/1991 | Fockens | 342/44 |
| 5,084,699 | 1/1992 | DeMichele | 340/10.34 |
| 5,105,190 | 4/1992 | Kip et al. | 340/10.2 |
| 5,241,298 | 8/1993 | Lian et al. | 340/572.2 |
| 5,287,113 | 2/1994 | Meier | 342/51 |
| 5,302,901 | 4/1994 | Snelten | 324/322 |
| 5,347,263 | 9/1994 | Carroll et al. | 340/10.42 |
| 5,373,303 | 12/1994 | D'Hont | 343/788 |
| 5,374,930 | 12/1994 | Schuermann | 342/51 X |
| 5,430,441 | 7/1995 | Bickley et al. | 340/10.2 |
| 5,446,447 | 8/1995 | Carney et al. | 340/572.4 |
| 5,517,179 | 5/1996 | Charlot, Jr. | 340/572.2 |
| 5,550,536 | 8/1996 | Flaxl | 340/10.2 |
| 5,596,273 | 1/1997 | Yabe et al. | 324/248 |
| 5,600,243 | 2/1997 | Colclough | 324/248 |
| 5,608,417 | 3/1997 | de Vall | 343/895 |
| 5,610,384 | 3/1997 | Goto | 235/435 |
| 5,621,323 | 4/1997 | Larsen | 324/318 |
| 5,680,106 | 10/1997 | Schrott et al. | 340/572.5 |
| 5,771,021 | 6/1998 | Veghte et al. | 342/51 X |
| 5,793,324 | 8/1998 | Aslanidis et al. | 342/51 |
| 5,841,364 | 11/1998 | Hagl et al. | 340/10.2 |

*Primary Examiner*—Thomas Mullen
*Attorney, Agent, or Firm*—Akin, Gump, Strauss, Hauer & Feld, L.L.P.

[57] ABSTRACT

An RFID tag circuit provides magnetic decoupling and amplitude modulation. The circuit is made up of a first inductor and a second inductor connected in series, a first capacitor, a second capacitor, and a switch. The circuit includes a first resonant circuit formed from a parallel connection of the series connected first and second inductors, and the first capacitor. The first resonant circuit has a primary resonant frequency. The circuit also includes a second circuit formed from a series connection of the second capacitor and the switch. The series connection of the second capacitor and the switch are connected in parallel to the second inductor. One end of the series connected second capacitor and switch is connected to the common connection between the series connected first and second inductors. When the switch is open, the second circuit has a minimal or no effect on the tag and the first resonant circuit resonates at the primary resonant frequency when the tag is exposed to an external field at or near the primary resonant frequency. When the switch is closed, the second circuit defines a high impedance parallel resonant circuit which functions to block or minimize current flow at the primary resonant frequency, thereby preventing the tag from drawing any significant amount of power from the external field and from resonating at the primary resonant frequency. The tag is thereby decoupled from its environment.

5 Claims, 2 Drawing Sheets

RFID TAG HAVING PARALLEL RESONANT CIRCUIT FOR MAGNETICALLY DECOUPLING TAG FROM ITS ENVIRONMENT

BACKGROUND OF THE INVENTION

Tagging of articles for identification and/or theft protection is known. For instance, many articles are identified using a bar code comprising coded information which is read by passing the bar code within view of a scanner. Many articles also include a resonant transponder or resonant tag for use in theft detection and prevention. More recently, passive resonant tags which return unique or semi-unique identification codes have been developed. These tags typically include an integrated circuit (IC) which stores the identification code. Such "intelligent" tags provide information about an article or person with which the tag is associated which is detected in the zone of an interrogator or reader. The tags are desirable because they can be interrogated rapidly, and from a distance. U.S. Pat. No. 5,446,447 (Carney et al.), U.S. Pat. No. 5,430,441 (Bickley et al.), and U.S. Pat. No. 5,347,263 (Carroll et al.) disclose three examples of such intelligent tags.

Radio frequency identification (RFID) tags or cards generally include a resonant antenna circuit electrically connected to the IC. The IC is essentially a programmable memory for storing digitally encoded information. The interrogator (transmit antenna) creates an electromagnetic field at the resonant frequency of the RFID tag. When the tag is placed into the field of the interrogator, an AC voltage is induced in the resonant antenna circuit of the tag, which is rectified by the IC to provide the IC with an internal DC voltage. As the tag moves into the field of the interrogator, the induced voltage increases. When the internal DC voltage reaches a level that assures proper operation of the IC, the IC outputs its stored data. To output its data, the IC creates a series of data pulses by switching in or out an extra capacitor or inductor across the antenna circuit for the duration of the pulse, which changes the resonant frequency of the tag, detuning the tag from the operational frequency. That is, the tag creates data pulses by detuning itself, which changes the amount of energy consumed by the tag. The interrogator detects the consumption of energy in its field and interprets the changes as data pulses.

Although such RFID tags or cards are known, there are still technical difficulties and limitations associated with the operation of such tags. One problem with attempting to read multiple RFID tags within an interrogation zone of the interrogator is that more than one tag may be activated by the interrogator at about the same time. When such tags are located proximate to each other, the fields generated by one tag can disturb the fields generated by another tag. This problem of mutual inductance is especially significant for RFID tags which transmit their information by detuning, as described above. As a consequence, the effective reading distance for the tags drops and the modulation of the tag can become completely ineffective due to the fact that such modulation depends upon the tag being in resonance (or close to it). Thus, such detuning caused by other tags can make the reading of stored information impossible or nearly impossible.

Long range reading applications require a highly modulated AM field. A high degree of AM modulation is obtained by providing the greatest field disturbance to the antenna's magnetic field. Maximum field disturbance (represented by a maximum amplitude difference) is obtained when the loading effect of the tag is completely removed after each field disturbance, and when the signal from a tag to be read is not mixed in with or attenuated by noise or interference from other tags. Thus, conventional schemes which do not effectively decouple tags from their environment cannot provide for long range reading.

One approach to minimizing the problem of an RFID tag generating fields which disturb or affect neighboring tags is described in copending U.S. application Ser. No. 09/035,027 filed Mar. 5, 1998, entitled "Apparatus for Magnetically Decoupling an RFID Tag," which is incorporated by reference in its entirety herein. In this approach, an RFID transponder includes an integrated circuit for storing data and an inductor electrically connected to the integrated circuit. The inductor includes a first coil electrically connected to a second coil. A resonant capacitor is electrically connected to the integrated circuit and to at least one of the first and second coils, such that the resonant capacitor and the at least one connected coil have a first predetermined resonant frequency. A switch having a first position and a second position is provided for selectively allowing current to flow through the second coil. When the switch is in the first position, exposure of the transponder to an external field at or near the first resonant frequency induces a voltage in the inductor and causes a first current to flow through the inductor in a first direction, thereby generating a local field. When the switch is in the second position, exposure of the transponder to an external field at or near the first resonant frequency induces a voltage in the inductor and causes a first current to flow through the first coil in a first direction, thereby generating a first local field and a second current to flow through the second coil in a second, opposite direction, thereby generating a second local field. A sum of the first and second local fields approaches zero.

This field canceling technique is feasible but has some disadvantages. For example, the circuit implementation uses a three turn coil in series with a one turn coil which requires approximately three times greater current flow in the one turn coil. This is difficult to achieve, especially when a low impedance switch must be connected across the one turn coil. The field canceling technique also limits the flexibility of the design because the mutual coupling between the coils is critical, and must be adjusted empirically.

Accordingly, there is a need for an alternative method of preventing RFID tags from generating fields which disturb or affect other nearby RFID tags or other resonant cards or tags. The present invention fulfills this need.

BRIEF SUMMARY OF THE INVENTION

The present invention provides a transponder which includes a first inductor and a second inductor connected in series, a first capacitor, a second capacitor, and a switch. A first resonant circuit and a second circuit are formed in the transponder. The first resonant circuit is formed from a parallel connection of the series connected first and second inductors, and the first capacitor. The first resonant circuit has a primary resonant frequency. The second circuit is formed from a series connection of the second capacitor and the switch. The series connection of the second capacitor and the switch is connected in parallel to the second inductor. Specifically, one end of the series connected second capacitor and switch is connected to the common connection between the series connected first and second inductors. When the switch is open, the second circuit has a minimal or no effect on the transponder and the first resonant circuit resonates at the primary resonant frequency when the transponder is exposed to an external field at or near the primary resonant frequency. When the switch is closed, the second circuit defines a high impedance parallel resonant circuit which functions to block or minimize current flow at the primary resonant frequency, thereby preventing the transponder from drawing any significant amount of power from the external field and from resonating at the primary resonant frequency. The transponder is thereby decoupled from its environment.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
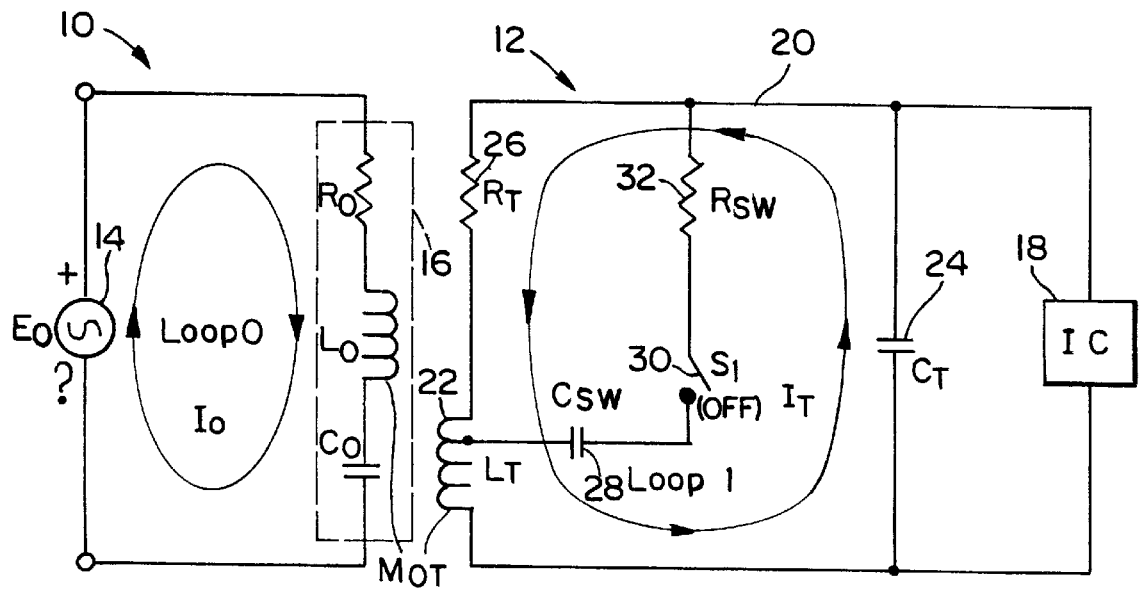
FIG. 1 is an equivalent circuit diagram in accordance with one preferred embodiment of the present invention showing an interrogator and a tag in a state where the tag is capable of resonating at its primary resonant frequency.

Certain terminology is used herein for convenience only and is not to be taken as a limitation on the present invention. In the drawings, the same reference numerals are employed for designating the same elements throughout the several figures.

Figure 2:
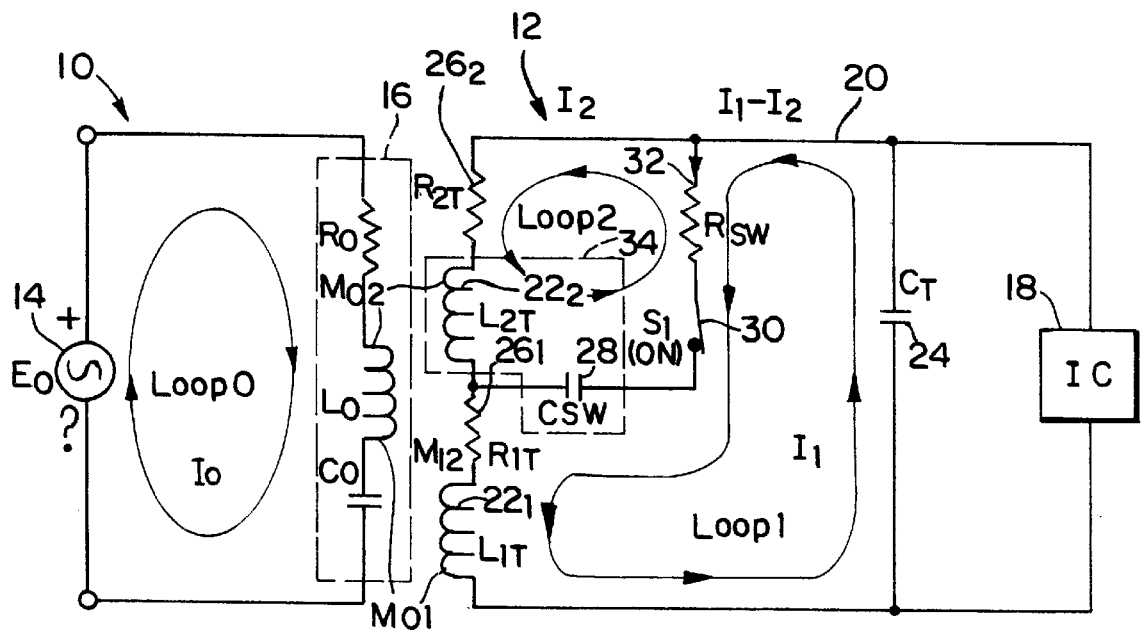
FIG. 2 is an equivalent circuit diagram in accordance with one preferred embodiment of the present invention showing an interrogator and a tag in a state where the tag is decoupled from it environment and is not capable of resonating at its primary resonant frequency.

FIGS. 1 and 2 are equivalent circuit diagrams of one preferred embodiment of the present invention. FIGS. 1 and 2 are representations of the same circuit, but in different states. The circuitry of FIGS. 1 and 2 are described in detail, followed by a discussion of the theory of operation of the circuit diagrams. The embodiment of the invention described herein is used with radio frequency identification (RFID) tags or transponders.

FIG. 1 is an equivalent electrical circuit diagram of an RFID reader or interrogator (hereafter, "interrogator 10") and a resonant RFID device, tag or transponder (hereafter, "transponder 12"). The interrogator 10 includes a voltage source 14 electrically connected to a transmitter coil or antenna 16 for generating an electromagnetic field. The antenna 16 is primarily defined by an inductance $L_0$, but also has an equivalent series resistance $R_0$ and capacitance $C_0$, which together define a series RLC circuit. These components define a current loop labeled as Loop 0 and having a current flow $I_0$.

The interrogator 10 and the transponder 12 communicate by inductive coupling, shown in FIG. 1 as mutual inductance $M_{OT}$. Interrogators which communicate with a resonant tag or transponder by inductive coupling are well known in the art. For instance, interrogators are described in U.S. Pat. Nos. 3,752,960, 3,816,708 and 4,580,041, all issued to Walton, all of which are incorporated by reference in their entirety herein. Accordingly, the interrogator 10 is not shown or described in detail. Suffice it to say that the interrogator 10 establishes an electromagnetic field at or near the resonant frequency of the transponder 12. When the transponder 12 is close enough to the interrogator 10 so as to be within the electromagnetic field, a voltage is induced in the transponder 12. As the transponder 12 moves into the field created by the interrogator 10, the induced voltage increases until a voltage level within the transponder 12 is reached which is sufficient to power the transponder 12 and permit the device to function according to its desired purpose, as described in more detail below. The interrogator 10 may be physically implemented as a pair of smart pedestals (not shown), as a hand-held RFID scanner (not shown) or in some other manner.

The interrogation signal generated by the interrogator 10 is preferably a generally continuous signal, as opposed to a periodic or pulsed signal. The interrogation zone is the area within the electromagnetic field in which a voltage is induced in the intelligent transponder 12 sufficient to power the transponder 12. Thus, the size of the interrogation zone is defined, at least, in part, by the strength of the electromagnetic field. The interrogator 10 can generally detect transmissions from a plurality of transponders 12 (and thus their associated articles) located within the interrogation zone.

Intelligent devices or transponders are generally known and applicable to a wide variety of uses. U.S. Pat. No. 5,430,441 (Bickley et al.) discloses a transponding tag which transmits a digitally encoded signal in response to an interrogation signal. The tag in Bickley et al. comprises a rigid substrate constructed from a plurality of dielectric layers and conductive layers and includes an integrated circuit embedded entirely within a hole in the substrate and tab bonded to conductive foil traces. The physical structure of the transponder 12 is described below with respect to FIGS. 3 and 4.

The transponder 12 of the present invention comprises an antenna circuit 20 electrically connected to an integrated circuit (IC) 18. The antenna circuit 20 comprises a resonant circuit which resonates at a predetermined radio frequency (RF) corresponding to a radio frequency of the interrogator 10, as discussed in more detail hereinafter.

The antenna circuit 20 may comprise one or more inductive elements electrically connected to one or more capacitive elements. In a preferred embodiment, the antenna circuit 20 is formed by the combination of a single inductive element, inductor, or coil 22 ($L_T$) electrically connected with a capacitive element or primary resonant capacitor 24 ($C_T$) in a series current loop, labeled as Loop 1. The inductor 22 is actually comprised of two coils wired in series, as explicitly shown in FIG. 2. The inductor 22 and the resonant capacitor 24 ($C_T$) are connected in parallel with the IC 18.

As is well known to those of ordinary skill in the art, the operational frequency of the antenna circuit 20 depends upon the values of the inductor 22 and the resonant capacitor 24. The size of the inductor 22 and the value of the capacitor 24 are determined based upon the desired resonant frequency of the antenna circuit 20. In one embodiment of the invention, the transponder 12 is constructed to operate at 13.56 MHz. Although it is preferred that the transponder 12 resonates at about 13.56 MHz, the transponder 12 could be constructed to resonate at other frequencies and the precise resonant frequency of the transponder 12 is not meant to be a limitation of the present invention. Thus, it will be apparent to those of ordinary skill in the art that the antenna circuit 20 may operate at radio frequencies other than 13.56 MHz, and indeed at other frequencies, such as microwave frequencies.

A resistor 26 ($R_T$) is shown connected in series with the inductor 22 which represents an equivalent series resistance of the inductor 22 due to power losses. In addition, although the antenna circuit 20 comprises a single inductive element, namely inductor 22, and a single capacitor 24, multiple inductor and capacitor elements could also be employed. For instance, multiple element resonant circuits are known in the electronic security and surveillance art, such as described in U.S. Pat. No. 5,103,210 (Rode et al.) entitled "Activatable/Deactivatable Security Tag for Use with an Electronic Security System", which is incorporated herein by reference. Although a preferred antenna is described, it will be apparent to those of ordinary skill in the art from this disclosure that any means for coupling energy to/from the IC 18 may be used.

Referring to FIG. 2, the transponder 20 also includes a second current loop path, Loop 2. Loop 2 includes a secondary capacitor 28 ($C_{SW}$) in series with a switch 30 ($S_1$). A resistor 32 ($R_{SW}$) is shown connected in series with the capacitor 28 and the switch 30. The resistor 32 represents an equivalent series resistance of these components due to power losses. As discussed above, the inductor 22 is actually comprised of two coils wired in series, as explicitly shown in FIG. 2. Loop 2 includes the secondary capacitor 28 ($C_{SW}$), one of the two coils of the inductor 22 and its equivalent resistance (shown in more detail in FIG. 2), resistor 32 ($R_{SW}$), and switch 30 ($S_1$). In FIG. 1, the switch 30 ($S_1$) is open or OFF, and Loop 2 does not affect the operation of the resonant circuit defined by the inductor 22 ($L_T$) and the capacitor 24 ($C_T$).

FIG. 2 shows the equivalent circuit in a state wherein the switch 30 ($S_1$) is closed or ON. FIG. 2 also shows the inductor 22 in more detail which is comprised of two inductors $22_1$ ($L_{1T}$) and $22_2$ ($L_{2T}$), wired in series. Inductor $22_1$ ($L_{1T}$) is the primary coil and inductor $22_2$ ($L_{2T}$) is the secondary coil. The secondary capacitor 28 ($C_{SW}$) is in series with the switch 30 ($S_1$) that is connected to the connection between the two inductors $22_1$ ($L_{1T}$) and $22_2$ ($L_{2T}$). The inductors $22_1$ ($L_{1T}$) and $22_2$ ($L_{2T}$) are coupled to one another via a mutual inductance $M_{12}$. The series combination of the two inductor coils is in parallel with the primary resonating capacitor 24 ($C_T$). The resistor 26 of FIG. 1 is represented in FIG. 2 by equivalent resistors $26_1$ and $26_2$ corresponding to the respective inductors $22_1$ and $22_2$. Loop 2 is more clearly defined in FIG. 2 and includes the capacitor 28 ($C_{SW}$), inductor $22_2$ ($L_{2T}$), resistor $26_2$ ($R_{2T}$), resistor 32 ($R_{SW}$), and switch 30 ($S_1$). When the switch 30 is closed, a parallel resonant circuit 34 is formed with the capacitor 28 ($C_{SW}$) and the inductor $22_2$ ($L_{2T}$). As discussed above, the impedance of the parallel resonant circuit 34 is ideally infinite. However, resistive losses in the components and in the switch 30 ($S_1$) limit the maximum impedance that can be realized, and are modeled by the resistor $26_2$ ($R_{2T}$) and the resistor 32 ($R_{SW}$).

Having defined the structure of the interrogator 10 and the transponder 12, the theory of operation of the two equivalent circuits is now described.

When the resonant frequency of a transponder is moved far away from its primary resonant frequency or fundamental frequency, here 13.56 MHz, the transponder 12 will have little or no loading effect on the interrogator 10, and will have little or no effect on a field resonating at the primary resonant frequency. More importantly, the transponder 12 will have little or no loading effect on other transponders in near proximity. The transponder would thus be decoupled from its environment or "cloaked."

A resonant circuit may be selectively shorted and opened depending upon how it is connected. A series resonant circuit forms a short at its resonant frequency, whereas a parallel resonant circuit forms an open circuit at its resonant frequency. The present invention uses a high impedance (ideally, infinite impedance) second resonant circuit comprising the capacitor 28 ($C_{SW}$) and the inductor $22_2$ ($L_{2T}$) to form an open circuit at the transponder's resonant frequency. The switch 30 ($S_1$) must be in the closed or ON position (FIG. 2) to form the open circuit. The open circuit functions to disconnect $L_{1T}$ from $C_T$, thereby preventing the transponder 12 from resonating at the primary resonant frequency. When the switch $S_1$ is closed, little to no current flows in loop 1 ($I_1$) or loop 2, ($I_2$). (The discussion herein assumes ideal conditions. In practice, $I_1$ and $I_2$ are not zero, but are negligible values.) Since no current flows in an open circuit, the transponder 12 does not draw power from the surrounding electromagnetic field and does not create any disturbances in the field which might confuse a reader. Thus, when the high impedance parallel resonant circuit is switched in, the transponder 12 consumes little or no energy and thus has little or no effect on the system receiver antenna, and is essentially removed from the magnetic environment.

When the switch $S_1$ is in the open or OFF position (FIG. 1), the second resonant circuit has no effect, and the transponder 12 resonates at the primary resonant frequency in the normal manner.

The switch $S_1$ may perform two different functions. First, the switch $S_1$ may be placed and maintained in the open position to allow the transponder 12 to be activatable upon receipt of the primary resonant frequency signal, or it may be placed and maintained in the closed position to permanently shut down the transponder 12 (i.e., put the transponder 12 to sleep) and thereby prevent it from interfering with the environment.

Second, the switch $S_1$ may be selectively moved between the open position and the closed position, in accordance with a stored data pattern (e.g., identification data stored in the transponder's IC chip 18) to tune and detune the antenna circuit comprising $L_T$ and $C_T$, such that the stored data is transmitted to the reader. Thus, the present invention may use the switch $S_1$ in lieu of a modulation capacitor to tune and detune the antenna circuit and transmit data to a reader. In the switch closed position, which is the transponder state during modulation and during cloaking, the transponder 12 is essentially removed from the environment.

Thus, the switch $S_1$ serves two purposes when it is in the closed position, as follows:

(1) It is used to amplitude modulate the internal code of the IC 18 onto the RF carrier, by closing momentarily, hence communicating information from the transponder 12. Long range reading applications require a highly modulated AM field. This scheme provides a high amount of AM modulation by providing the greatest disturbance to the antenna's magnetic field, by selectively removing the loading effect that the transponder 12 has on the interrogator 10.

(2) It is used to decouple the transponder 12 from the environment, thereby minimizing the risk that the transponder 12 will detune, shadow, or otherwise interfere with neighboring transponders. The transponder 12 is thus particularly suitable for environments, such as retail stores, where many tagged articles are physically close to one another, and it is desirable to read the identity codes of all of these articles. After the code of an article is read, the closed switch position removes the article's transponder from the environment magnetically (as opposed to physically) so that it will not detune, shadow or otherwise interfere with the reading of transponders in neighboring articles.

In both instances, the position of the switch $S_1$ functions to either (1) form the open circuit with the second parallel resonant circuit, thereby preventing the transponder 12 from resonating at its resonant frequency and decoupling the transponder 12 from its environment, or (2) prevent the second parallel resonant circuit from having any influence on the transponder 12, thereby allowing the transponder 12 to operate in the normal manner where it is allowed to resonate at its primary resonant frequency.

Referring to FIG. 1 wherein the switch 30 ($S_1$) is open, the combination of inductor 22 ($L_T$) and capacitor 24 ($C_T$) resonate at a frequency, $f_0$, given by:

$$f_0 = \frac{1}{2\pi\sqrt{L_T C_T}}$$

where $L_T = L_{1T} + L_{2T} + M_{12}$.

To achieve the best modulation/cloaking in the "switch closed" state of FIG. 2, the circuit design should minimize $M_{12}$ (i.e., the mutual inductance/coupling coefficient between $L_{1T}$ and $L_{2T}$), as well as $M_{02}$ (i.e., the mutual inductance/coupling coefficient between $L_0$ and $L_{2T}$) $M_{12}$ may be minimized by a careful layout of the geometrical orientation of the two inductor coils $L_{1T}$ and $L_{2T}$. This may be accomplished by using conventional methods for minimizing coupling between two coil antennas through optimum overlap of the coils. Since such methods are conventional, no further description is provided herein.

Referring to FIG. 2 wherein the switch 30 ($S_1$) is closed, the parallel resonant frequency formed by the capacitor 28 ($C_{SW}$) and the inductor 22$_2$ ($L_{2T}$) is given by:

$$f_{PAR} = \frac{1}{2\pi\sqrt{(L_{2T} + M_{02} + M_{12})C_{SW}}}$$

The frequency of the parallel resonant circuit 34, $f_{PAR}$, is chosen to be equal to $f_0$, thereby providing the greatest achievable impedance difference and a coupling coefficient which approaches zero. The values for $L_{2T}$, $M_{02}$ and $M_{12}$ are given, since the coil geometry is given and a measurement of the net $L_{2T}$ may be obtained. Thus, the equation may be solved for $C_{SW}$. In contrast to the present invention, in the field canceling technique described in copending U.S. application Ser. No. 09/035,027, the mutual coupling between the coils is critical and must be adjusted empirically. The capacitance value ($C_{SW}$) is determined for the worst case conditions which occurs when the transponder 12 is at a maximum detectable distance from the antenna. At this distance, mutual coupling between the antenna and the transponder 12 is at a minimum, and the total inductance is dominated by the inductance of the transponder 12. That is, the mutual inductance of the transponder 12 and antenna is smaller than the inductance of the transponder coil.

Preferably, the IC 18, provided for storing data, is a passive device which is powered by the voltage induced in the antenna circuit 20 by the interrogator 10. That is, when the transponder 12 is close enough to the interrogator 10 so as to be within the electromagnetic field, the voltage induced on the inductor 22 provides power to the IC 18 at an antenna input (not shown) of the IC 18. The IC 18 internally rectifies the induced AC voltage at the antenna input to provide an internal DC voltage source. When the internal DC voltage reaches a level that assures proper operation of the IC 18, the IC 18 functions to output a digital value stored in the programmable memory at a modulation output (not shown) of the IC 18.

As discussed above, one method of transmitting the data stored in the IC 18 to a reader (not shown) is through the use of a modulation capacitor connected to the modulation output of the IC 18 and to the antenna circuit 20. According to this method, the data output pulses at the modulation output switch a modulation capacitor into and out of the antenna circuit 20 by making and breaking ground connections to change the overall capacitance of the circuit 20 in accordance with the stored data, which in turn changes the resonant frequency of the circuit 20, detuning it from the first predetermined resonant frequency to a predetermined higher or lower frequency. Thus, data pulses of the transponder 12 are created by the tuning and detuning of the resonant antenna circuit 20, such that instead of the antenna circuit 20 returning a simple single frequency response signal, it returns a signal containing a packet of preprogrammed information. Of course, as will be understood by those of ordinary skill in the art, other suitable means of modulation may be used with the present invention. As discussed above, the present invention may use the switch $S_1$ in lieu of a modulation capacitor to tune and detune the antenna circuit and transmit data to a reader.

The packet of information (data pulses) is received and processed by receiving circuitry (not shown) usually associated with the interrogator 10. That is, the receiving circuitry senses the changes in the consumption of energy within the electromagnetic field of the interrogator 10 to determine the digital data value output from the IC 18. If necessary, the data is decoded by the interrogator 10 or circuitry associated therewith to provide identification or other information about an article or person with which the transponder 12 is associated. It is presently preferred to use a passive IC 18 which is powered by the voltage induced in the antenna circuit 20. However, other means for powering the IC 18, such as a battery, are within the scope of the present invention.

The IC 18 may also include a power return or ground output (not shown) and one or more additional inputs (not shown) which are used for programming the IC 18 (i.e. storing or altering the digital value stored therein) in a conventional manner. In the presently preferred embodiment, the IC 18 comprises 128 bits of nonvolatile memory. Of course, it will be apparent to those of ordinary skill in the art that the IC 18 could have either a greater or smaller storage capacity.

Equivalent circuit models for FIGS. 1 and 2 are provided below:

EQUIVALENT CIRCUIT MODELS $$R_{1T} = \frac{N_1}{N_T}, R_{2T} = \frac{N_2}{N_T} \; N_T = N_1 + N_2 (R_T = R_{1T} + R_{2T})$$

$R_{1T}$: Resistance of $L_1$, $R_{2T}$: Resistance of $L_2$ $N_1$: Number of turns of $L_1$, $N_2$: Number of turns of $L_2$ -continued $$L = \alpha N^2 \alpha: \text{Constant}$$
$$L_1 = \alpha N_1^2, \quad L_2 = \alpha N_2^2$$

$M_{0T} = k_{0T}\sqrt{L_0 L_T}$  $k_{0T}$: Coupling coefficient between $L_0$ & $L_T$ (distance dependant)

$M_{01} = k_{01}\sqrt{L_0 L_1}$  $k_{01}$: Coupling coefficient between $L_0$ & $L_1$ (distance dependant)

$M_{02} = k_{02}\sqrt{L_0 L_2}$  $k_{02}$: Coupling coefficient between $L_0$ & $L_2$ (distance dependant)

$$k_{01} \approx k_{02}$$

$M_{12} = k_{12}\sqrt{L_1 L_2}$  $k_{01}$: Coupling coefficient between $L_0$ & $L_1$ (Tag structure dependant)

A mathematical analysis of FIG. 1 (SW-OFF Case) and FIG. 2 (SW-ON Case) is provided below.

SW-OFF Case

For Loop0

$$E_0 = \left(\frac{1}{j\omega C_0} + j\omega L_0 + R_0\right)I_0 + j\omega M_{0T} I_T \tag{1}$$

For Loop1

$$0 = \left(\frac{1}{j\omega C_T} + j\omega L_T + R_T\right)I_T + j\omega M_{0T} I_0 \tag{2}$$

using (1) and (2)

$$\begin{bmatrix} E_0 \\ 0 \end{bmatrix} = \begin{bmatrix} \frac{1}{j\omega C_0} + j\omega L_0 + R_0 & j\omega M_{0T} \\ j\omega M_{0T} & R_T + j\omega L_T + \frac{1}{j\omega C_T} \end{bmatrix} \begin{bmatrix} I_0 \\ I_T \end{bmatrix} \tag{3}$$

$$= Z \begin{bmatrix} I_0 \\ I_T \end{bmatrix}$$

if $Y$ is defined as $Y = inv(Z)$ $$\begin{bmatrix} I_0 \\ I_T \end{bmatrix} = Y \begin{bmatrix} E_0 \\ 0 \end{bmatrix} = \begin{bmatrix} Y_{11} & Y_{12} \\ Y_{21} & Y_{22} \end{bmatrix} \begin{bmatrix} E_0 \\ 0 \end{bmatrix} \tag{4}$$

Impedance of the antenna $Z_{ant\_off}$ is, $$Z_{ant\_off} = \frac{E_0}{I_0} = \frac{1}{Y_{11}} \tag{5}$$

SW-ON Case

For Loop0

$$E_0 = \left(\frac{1}{j\omega C_0} + j\omega L_0 + R_0\right)I_0 + j\omega M_{01} I_1 + j\omega M_{02} I_2 \tag{6}$$

For Loop1

$$0 = \left(\frac{1}{j\omega C_T} + j\omega L_{1T} + R_{1T}\right)I_1 + j\omega M_{01} I_0 + j\omega M_{12} I_2 + \left(R_{sw} + \frac{1}{j\omega C_{SW}}\right)(I_2 - I_2) \tag{7}$$

For Loop2

$$0 = (j\omega L_2 + R_2)I_2 + j\omega M_{02} I_0 + j\omega M_{12} I_1 + \left(R_{sw} + \frac{1}{j\omega C_{SW}}\right)(I_2 - I_1) \tag{8}$$

using (6), (7) and (8)

$$\begin{bmatrix} E_0 \\ 0 \\ 0 \end{bmatrix} = \begin{bmatrix} \frac{1}{j\omega C_0} + j\omega L_0 + R_0 & j\omega M_{01} & j\omega M_{02} \\ j\omega M_{01} & \frac{1}{j\omega C_T} + j\omega L_{1T} + R_{1T} + R_{sw} + \frac{1}{j\omega C_{SW}} & j\omega M_{12} - R_{sw} - \frac{1}{j\omega C_{SW}} \\ j\omega M_{02} & j\omega M_{12} - R_{sw} - \frac{1}{j\omega C_{SW}} & j\omega L_{2T} + R_{2T} + R_{sw} + \frac{1}{j\omega C_{SW}} \end{bmatrix} \begin{bmatrix} I_0 \\ I_2 \\ I_2 \end{bmatrix} \tag{9}$$

$$= Z' \begin{bmatrix} I_0 \\ I_2 \\ I_2 \end{bmatrix}$$

if $Y'$ is defined as $Y' = inv(Z')$ $$\begin{bmatrix} I_0 \\ I_2 \\ I_2 \end{bmatrix} = Y' \begin{bmatrix} E_0 \\ 0 \\ 0 \end{bmatrix} = \begin{bmatrix} Y'_{11} & Y'_{12} & Y'_{13} \\ Y'_{21} & Y'_{22} & Y'_{23} \\ Y'_{31} & Y'_{32} & Y'_{33} \end{bmatrix} \begin{bmatrix} E_0 \\ 0 \\ 0 \end{bmatrix} \tag{10}$$

Impedance of the antenna $Z_{ant\_on}$ is, $$Z_{ant\_on} = \frac{E_0}{I_0} = \frac{1}{Y'_{11}} \tag{11}$$

Figure 3:
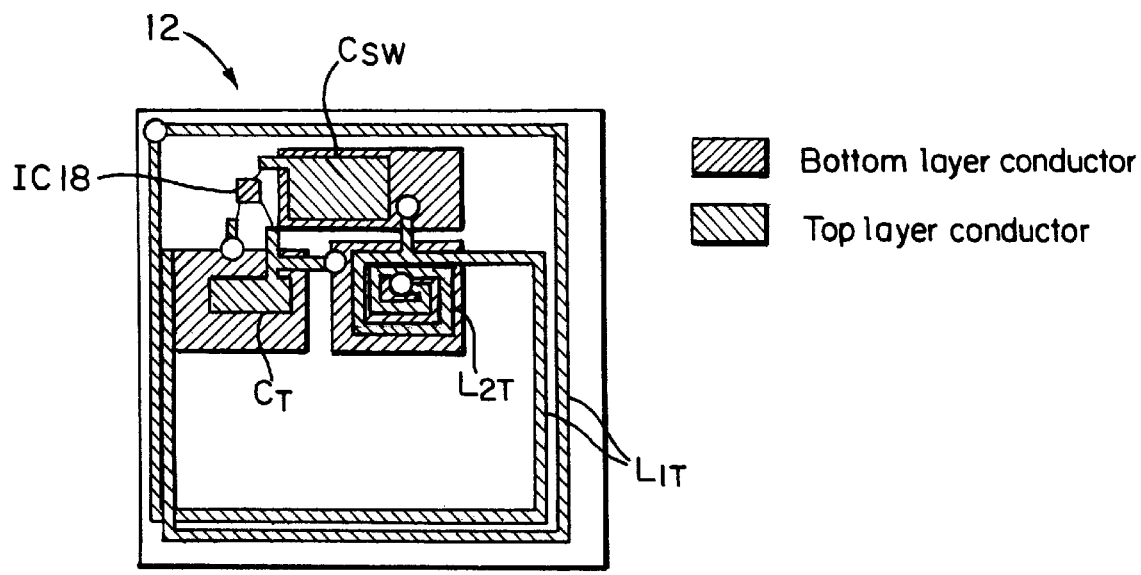
FIG. 3 is a first embodiment of a packaging configuration for the tag of FIGS. 1 and 2.

Constants provided for the interrogator 10 (antenna) and the transponder 12 (tag) in an experimental simulation of the present invention are as follows:

Antenna $C_0 = 136.5 \times 10^{-12} [F]$ $L_0 = 1.0092 \times 10^{-6} [H]$ determined so that $f_0$ becomes 13.56 MHz $Q_0 = 70$ $R_0 = \dfrac{\omega L_0}{Q_0} = 1.228 \; [\Omega]$ $k_{oT} = k_{0T1} = 0.03$ $k_{0T2} = 0.03$ or $0.0$ Tag $C_T = 125.24 \times 10^{-12} [F]$ determined so that $f_0$ becomes 13.56 MHz $L_T = 1.10 \times 10^{-6} [H]$ $Q_T = 80$ $R_T = \dfrac{\omega L_0}{Q_0} = 1.1715 \; [\Omega]$ $k_{0T2}$, $C_{SW}$ and $R_{SW}$ are changeable FIG. 3 is a first embodiment of a packaging configuration for the transponder 12 implemented as a paper tag having all inductors, capacitors, and the IC 18 thereon. The packaging configuration shows the placement of the four key components, inductor $22_1$ ($L_{1T}$), inductor $22_2$ ($L_{2T}$), primary resonating capacitor 24 ($C_T$) and secondary capacitor ($C_{SW}$). The bottom layer conductor below $L_{2T}$ may help to decouple $L_{2T}$ with another transponder coil and the antenna. The switch 30 ($S_1$) preferably resides in the IC 18, but alternatively may be realized with a discrete transistor.

In the preferred embodiment of the present invention, the capacitors $C_T$ and $C_{SW}$ are fabricated with aluminum foil plates that sandwich a polyethylene dielectric. This fabrication process is conventional and thus is not described in more detail herein. Alternative embodiments use discrete chip capacitors using other types of dielectrics (e.g., ceramic, tantalum) and/or other types of form factors, namely, surface mount, leaded or thick film printed capacitors. One or both of the capacitors may reside inside an IC chip. At least one of the capacitors, such as $C_T$, may be a "distributed" capacitance between the coils of $L_{1T}$ and $L_{2T}$. A distributed capacitance is formed from lengths of inductors, as opposed to using a discrete component, as is well-known in the art.

In the preferred embodiment of the present invention, both of the inductor coils $L_{1T}$ and $L_{2T}$ are etched onto a laminated aluminum structure.

In an alternative embodiment, at least one of the inductor coils is etched or stamped onto a laminated aluminum structure. These inductor coils may reside in the same or different sides of the laminated structure. The other inductor coil may be stamped or may be fabricated with a discrete inductor coil. The discrete inductor coil may have a surface mountable, or leaded (through hole) form factor.

One alternative embodiment uses one etched or stamped aluminum coil and one discrete coil that may be in a surface mount package. This embodiment offers flexibility in the geometric orientation of the coils, which is helpful in minimizing coupling between the two coils. Other alternative embodiments may use permutations of stamped coils with discrete and/or etched coils. Alternatively, these coils may be embodied with loops of copper or aluminum wire.

This technique is commonly used for reusable, hard tags. The inductor coils may also be fabricated using ferromagnetic materials.

Aluminum is the preferred material to be used in the construction of the inductor coils and/or capacitor plates, primarily for cost purposes. However, if cost is not a primary concern, other metallic materials with high electrical conductivity may be used for the inductor coils and/or capacitor plates. Such materials include copper, tin, lead, nickel, gold, silver, tungsten, titanium, molybdenum, platinum, and alloys of such metals.

Figure 4:
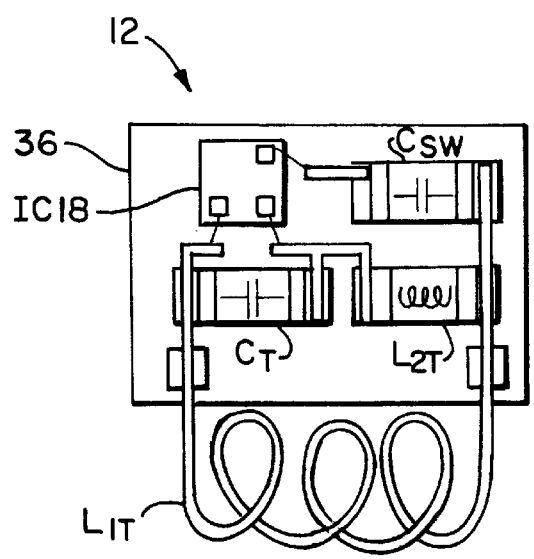
FIG. 4 is a second embodiment of a packaging configuration for the tag of FIGS. 1 and 2.

FIG. 4 is a second embodiment of a packaging configuration for the transponder 12. In this configuration, the primary coil $L_{1T}$ is implemented as a single layer paper tag coil. The secondary coil $L_{2T}$ and the two capacitors $C_T$ and $C_{SW}$ are put on a printed circuit (PC) board 36. The secondary coil $L_{2T}$ has a high Q. The switch 30 ($S_1$) (not shown) is also put on the PC board 36.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A transponder including a first inductor and a second inductor connected in series, a first capacitor, a second capacitor, and a switch, the transponder comprising:

(a) a first resonant circuit formed from a parallel connection of (i) the series connected first and second inductors, and (ii) the first capacitor, the first resonant circuit having a primary resonant frequency; and (b) a second circuit formed from a series connection of the second capacitor and the switch, the series connection of the second capacitor and the switch being connected in parallel to the second inductor, one end of the series connected second capacitor and switch being connected to the common connection between the series connected first and second inductors, wherein when the switch is open, the second circuit has a minimal or no effect on the transponder and the first resonant circuit resonates at the primary resonant frequency when the transponder is exposed to an external field at or near the primary resonant frequency, and when the switch is closed, the second circuit defines a high impedance parallel resonant circuit which functions to block or minimize current flow at the primary resonant frequency, thereby preventing the transponder from drawing any significant amount of power from the external field and from resonating at the primary resonant frequency, the transponder thereby being decoupled from its environment.

2. A transponder according to claim 1 wherein the primary resonant frequency is:

$$f_0 = \dfrac{1}{2\pi \sqrt{L_T C_T}}$$

where $L_T = L_{1T} + L_{2T} + M_{12}$, and $L_{1T}$ is the inductance of the first inductor, $L_{2T}$ is the inductance of the second inductor, $M_{12}$ is the mutual inductance between the first and second inductors, and $C_T$ is the capacitance of the first capacitor.

3. A transponder according to claim 2 wherein the parallel resonant frequency of the second circuit when the switch is closed is:

$$f_{PAR} = \frac{1}{2\pi\sqrt{(L_{2T} + M_{02} + M_{12})C_{SW}}}$$

where $L_{2T}$ is the inductance of the second inductor, $M_{12}$ is the mutual inductance between the first and second inductors, $M_{02}$ is the mutual inductance between the second inductor and an inductor of an interrogation antenna; and $C_{SW}$ is the capacitance of the second capacitor, wherein the values of the inductors and capacitors are selected so that $f_{PAR}$ is equal to $f_0$.

4. A transponder according to claim 1 wherein the transponder is a radio frequency intelligent tag circuit for an RFID tag.

5. A transponder according to claim 4 further comprising:

(c) an integrated circuit connected to the first resonant circuit for outputting data, the changing state of the switch causing the data to be modulated and transmitted from the transponder to an interrogation reader.

* * * * *